US008831777B2

(12) United States Patent
Kimoto (10) Patent No.: US 8,831,777 B2
(45) Date of Patent: Sep. 9, 2014

(54) ROBOT PROGRAM CHANGING DEVICE (71) Applicant: Fanuc Corporation, Yamanashi (JP)

(72) Inventor: Yuuki Kimoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/859,993

(22) Filed: Apr. 10, 2013

(65) Prior Publication Data

US 2013/0317646 A1    Nov. 28, 2013

(30) Foreign Application Priority Data

May 24, 2012  (JP) .................................. 2012-118638

(51) Int. Cl.
G05B 19/18    (2006.01)

(52) U.S. Cl.
USPC ........... 700/250; 700/245; 700/247; 700/254; 700/260; 700/262; 700/264; 702/150; 702/154

(58) Field of Classification Search
USPC ......... 700/245, 247, 250, 254, 260, 262, 264; 702/150
See application file for complete search history.

(56) References Cited

U.S. PATENT DOCUMENTS

| 4,815,007 | A | * | 3/1989 | Sakai et al. ................... 700/253 |
| 5,495,410 | A |   | 2/1996 | Graf |
| 5,993,044 | A | * | 11/1999 | Ohto et al. .................... 700/262 |
| 6,167,328 | A | * | 12/2000 | Takaoka et al. ............... 700/264 |
| 7,881,917 | B2 | * | 2/2011 | Nagatsuka et al. ............. 703/7 |
| 8,121,731 | B2 | * | 2/2012 | Ban et al. ..................... 700/254 |
| 2005/0107919 | A1 |  | 5/2005 | Watanabe et al. |
| 2008/0013825 | A1 |  | 1/2008 | Nagatsuka et al. |
| 2008/0154428 | A1 |  | 6/2008 | Nagatsuka et al. |
| 2009/0043425 | A1 |  | 2/2009 | Ito et al. |
| 2011/0087373 | A1 |  | 4/2011 | Nagatsuka et al. |

FOREIGN PATENT DOCUMENTS

| CN | 101105715 | A |   | 1/2008 |         |
| CN | 101204813 | A |   | 6/2008 |         |
| CN | 101362335 | A |   | 2/2009 |         |
| JP | 03213285  | A | * | 9/1991 | ................. B25J 9/10 |
| JP | 836409    | A |   | 2/1996 |         |

(Continued)

OTHER PUBLICATIONS

Office Action mailed Sep. 3, 2013 corresponds to Japanese patent application No. 2012-118638.

(Continued)

*Primary Examiner* — Khoi Tran
*Assistant Examiner* — Jaime Figueroa
(74) *Attorney, Agent, or Firm* — Lowe Hauptman & Ham, LLP (57) ABSTRACT A program changing device includes a sequence interchanging unit for interchanging plural teaching points in a teaching sequence such that total movement time of a robot becomes smaller than that when the robot is moved in line with an initial teaching sequence of the teaching points, a calculating unit for calculating difference amounts between the initial teaching points and a trajectory of the robot that is obtained by executing an after-interchanged operational program by simulation, a position adjusting unit for adjusting positions of the teaching points of the after-interchanged operational program until the difference amounts become equal to or smaller than a predetermined allowable value, and a teaching point changing unit for changing the adjusted teaching points to be the initial teaching points when cycle time of the after-interchanged operational program including the adjusted teaching points is longer than initial cycle time.

12 Claims, 11 Drawing Sheets

(56) References Cited

FOREIGN PATENT DOCUMENTS

| | | |
|---|---|---|
| JP | 1133726 A | 2/1999 |
| JP | 11249723 A | 9/1999 |
| JP | 11249725 A | 9/1999 |
| JP | 200188073 A | 4/2001 |
| JP | 2004237441 A | 8/2004 |
| JP | 2007-054942 A | 3/2007 |

OTHER PUBLICATIONS

Office Action issued May 6, 2014, corresponds to Chinese patent application No. 201310194262.1.

* cited by examiner

ROBOT PROGRAM CHANGING DEVICE

BACKGROUND OF THE INVENTION

1. Field of the Invention

The present invention relates to a robot program changing device that changes an operational program for a robot so that the robot performs a desired movement.

2. Description of the Related Art

Generally, a robot operational program that is created offline is rarely used in an actual situation without correction, and is used after correction. This is because a relative positional relationship between a workpiece and a robot, a posture of a robot, and the like subtly differ between an offline world and an online world (actual situation), and such differences occur.

As described in Japanese Unexamined Patent Publication No. 2007-54942, a load of a motor of a robot is obtained by simulation, and on the basis of the obtained load, a command speed or a command acceleration of an operational program is changed to eliminate the above-described differences.

Moreover, in some cases, a smooth operation is taught. Thereby, while a deceleration is started for positioning at a certain teaching point indicated by one operational command, an acceleration is started for moving to another teaching point indicated by a next operational command to smoothly connect movements indicated by two operational commands.

Figure 12A:
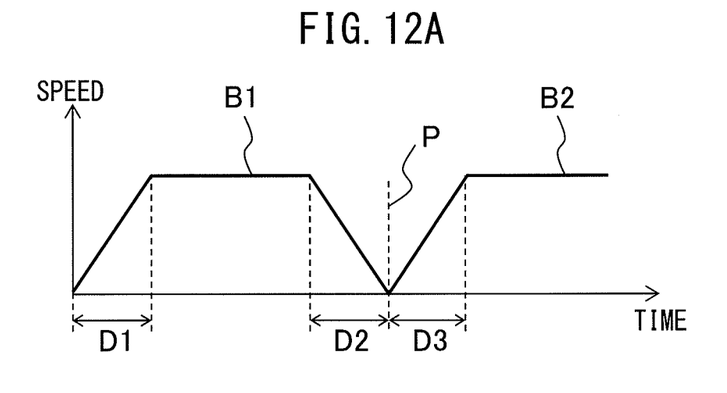
FIG. 12A is a first illustration for explanation of a smooth operation.
Figure 12B:
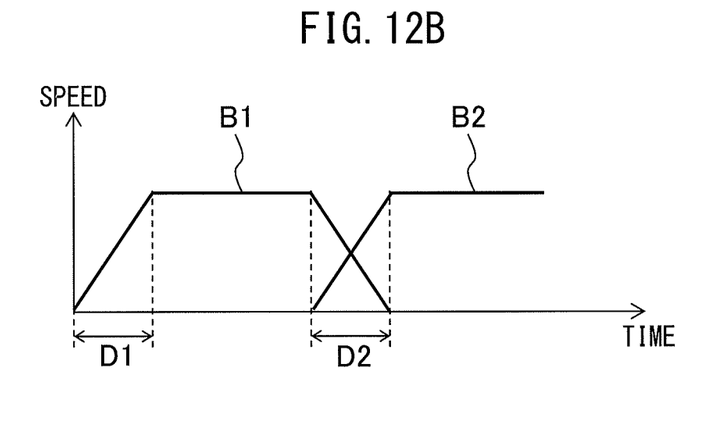
FIG. 12B is a second illustration for explanation of a smooth operation.
Figure 12C:
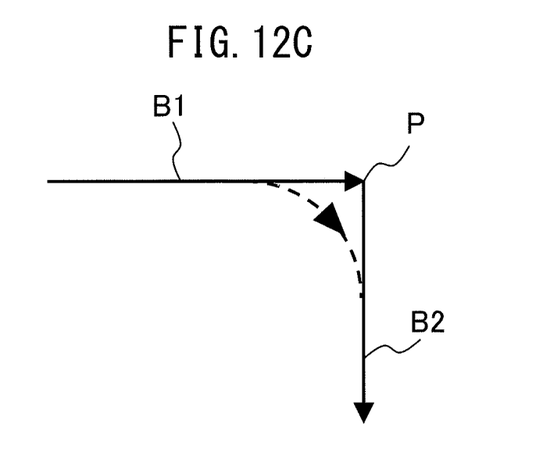
FIG. 12C is a third illustration for explanation of a smooth operation.

FIGS. 12A to 12C are illustrations for explanation of the smooth operation. When the smooth operation is not taught, as illustrated in FIG. 12A, in a duration D1 of a movement command in a first block B1, a robot accelerates at a predetermined acceleration, and in a duration D2, the robot similarly decelerates to arrive at a teaching point P. Then, in a duration D3 of a movement command in a second block B2, the robot accelerates again to start to move toward another teaching point. In this case, the robot moves on a trajectory drawn by the solid line in FIG. 12C.

On the contrary, when the smooth operation is taught, as illustrated in FIG. 12B, at the time of the start of the duration D2, a robot starts to decelerates for the first block B1, and starts to accelerate for the second block B2. For this reason, at the end of the duration D2, the robot stops the decelerating operation for the first block B1, and stops the accelerating operation for the second block B2. Accordingly, when the smooth operation is taught, as illustrated in FIG. 12C, the robot can smoothly shift from the first block B1 to the second block B2.

As illustrated by the solid line in FIG. 12C, when the smooth operation is not taught, the operational command for the first block B1 causes the robot to arrive at the teaching point P. However, when the smooth operation is taught, as illustrated by the broken line in FIG. 12C, the trajectory in which the robot does not pass through the teaching point P is formed. Accordingly, teaching the smooth operation possibly causes an actual movement path of the robot to depart from a target movement path.

On the contrary, when the smooth operation is not taught, teaching points are connected to each other so as to form the shortest line, and an actual path of the robot does not depart from the target movement path. However, when the smooth operation is not taught, a cycle time can increase, as indicated by comparison between FIG. 12A and FIG. 12B.

In view of the above-described problem, the present invention was made. An object of the present invention is to provide a robot program changing device that changes an operational program so as to enable a robot to move via an original teaching point while decreasing a cycle time of the operational program, even when a smooth operation is taught.

SUMMARY OF THE INVENTION

In order to accomplish the above-described object, according to a first aspect, there is provided a robot program changing device that changes a program of a robot performing smooth operation in which while deceleration is being performed by a first movement command, acceleration is performed by a second movement command to smoothly shift from the first movement command to the second movement command, including: a program storage unit for storing an operational program of the robot; an initial storage unit for storing cycle time of the operational program as initial cycle time, storing positions of a plurality of teaching points of the operational program as a plurality of initial teaching points, and storing a teaching sequence of the plurality of initial teaching points of the operational program as an initial teaching sequence, when the operational program stored in the program storage unit is executed by simulation; a sequence interchanging unit for interchanging the plurality of teaching points in the teaching sequence such that sum of movement time of the robot respectively spent by the robot to move between respective two of the plurality of teaching points becomes smaller than sum of movement time when the robot is moved in line with the initial teaching sequence of the plurality of initial teaching points stored in the initial storage unit; an arm tip position storage unit for storing positions of an arm tip of the robot at predetermined time intervals when the after-interchanged operational program for which the teaching points have been interchanged in the teaching sequence by the sequence interchanging unit is executed by simulation; a calculating unit for calculating, for each initial teaching point, difference amounts between a trajectory of the robot and the initial teaching points stored in the initial storage unit, the trajectory being created on the basis of the positions, stored in the arm tip position storage unit, at the predetermined time intervals; a position adjusting unit for adjusting the positions of the teaching points of the after-interchanged operational program until the difference amounts calculated by the calculating unit becomes equal to or smaller than a predetermined allowable value; and a teaching point changing unit for, when the after-interchanged operational program including the teaching points adjusted by the position adjusting unit is executed by simulation, if cycle time of the executed after-interchanged operational program is longer than the initial cycle time stored in the initial storage unit, changing the adjusted teaching points to be the initial teaching points to adopt the initial teaching sequence.

According to a second aspect, in the first aspect, the sequence interchanging unit includes: a movement time calculating unit for dividing a movement angle around each axis of the robot by a rotational speed around each axis of the robot to calculate movement time respectively spent between respective two of the teaching points in the after-interchanged operational program, and the operational program before interchange of the teaching points in the teaching sequence; a determining unit for interchanging, in the teaching sequence, two teaching points among the plurality of teaching points in the operational program, and estimating whether or not a difference is equal to or smaller than a time allowable value, the difference being obtained by subtracting, from sum of the movement time of the robot respectively spent between respective two of the plurality of teaching points after interchange of the teaching points, sum of the respective movement time of the robot before interchange of the teaching points; a sequence adopting unit for adopting the teaching sequence after interchange of the teaching points when the determining unit determines that the difference is equal to or smaller than the time allowable value, and adopting the teaching sequence before interchange of the teaching points when the determining unit determines that the difference is not equal to or smaller than the time allowable value; an allowable value changing unit for changing the allowable value to be decreased by a predetermined amount after the sequence adopting unit adopts the teaching sequence after interchange of the teaching points or the teaching sequence before interchange of the teaching points; and a repeating unit for repeating a process of interchanging the teaching points in the teaching sequence within the predetermined maximum attempting number of times until the allowable value changed by the allowable value changing unit becomes a predetermined specified value.

According to a third aspect, in the first aspect, the sequence interchanging unit interchanges the teaching points in the teaching sequence on the basis of an angle made by first and second movement vectors respectively corresponding to first and second operational segments that respectively exist between respective two of three successive teaching points of the operational program, and on the basis of movement time for the second operational segment.

According to a fourth aspect, in any one of the first to third aspects, when the difference amount calculated by the calculating unit exceeds the allowable value, the position adjusting unit performs position adjustment by shifting the teaching points of the after-interchanged program by a fixed distance in directions of vectors directed toward the initial teaching points from the points that are positioned on the trajectory such that distance from the initial teaching points to the points on the trajectory become the smallest.

According to a fifth aspect, in any one of the first to fourth aspects, the robot program changing device further includes a changing unit for changing a command value of at least one of a speed, acceleration and a smoothing degree of the robot in the operational program so as to decrease cycle time of the operational program, directly before position adjustment of the teaching points of the operational program is performed.

The above-described object, feature, advantage, and other objects, features, and advantages of the present invention will become more apparent from detailed description of typical embodiments of the present invention that are depicted in the attached drawings.

DETAILED DESCRIPTION

In the following, the embodiments of the present invention will be described referring to the attached drawings. In the drawings mentioned below, the same reference numerals are attached to the same members. For easy understanding, the contraction scales of these drawings are properly changed.

Figure 1:
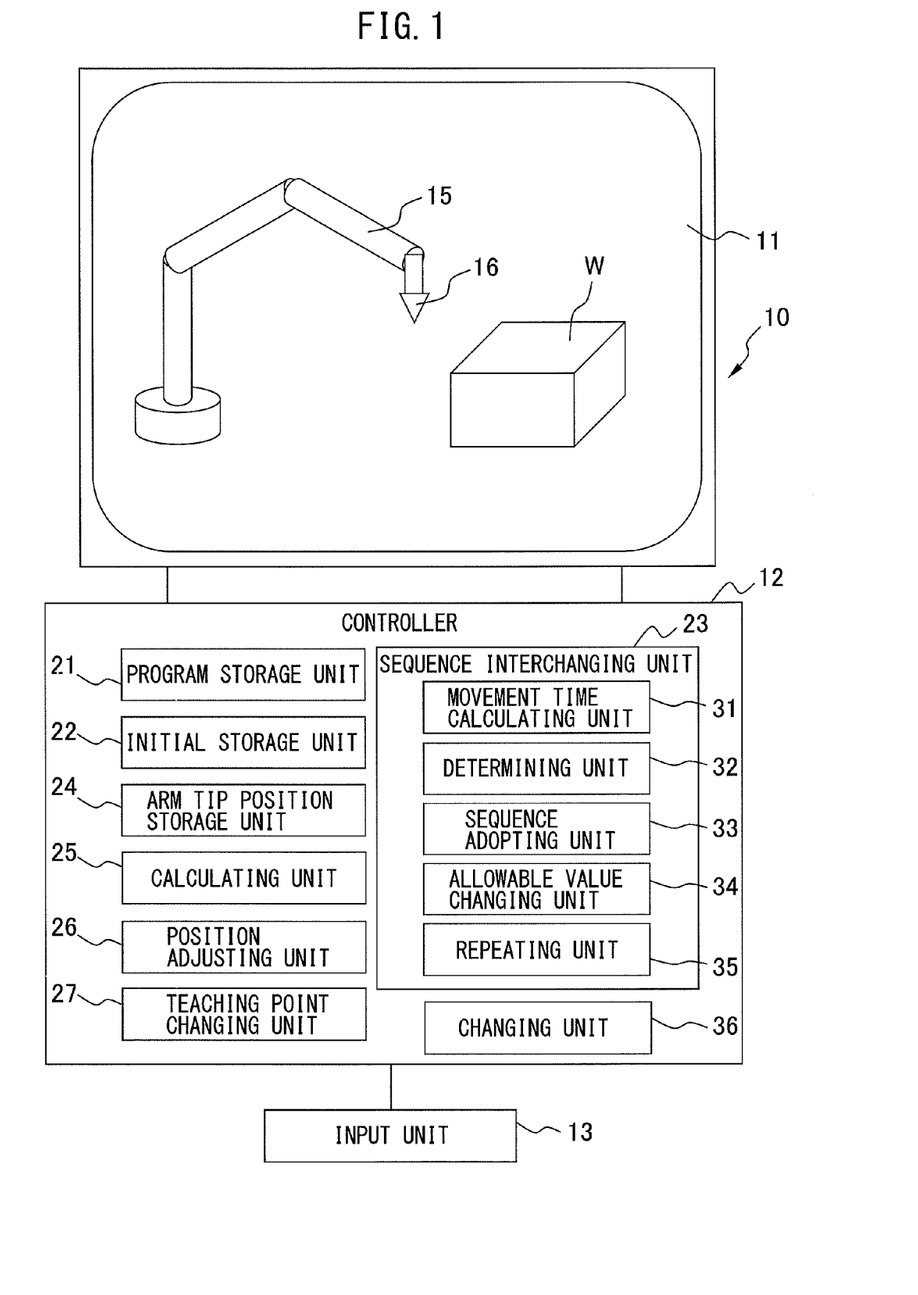
FIG. 1 is a functional block diagram of a robot program changing device based on the present invention.

FIG. 1 is a functional block diagram of a robot program changing device based on the present invention. As illustrated in FIG. 1, the robot program changing device 10 mainly includes a displaying unit 11 such as a crystal liquid display, a controller 12 such as a computer, an input device 13 such as a keyboard and a mouse, and the like.

Displayed in the displaying unit 11 is a three-dimensional model of a robot 15 with a tool 16 at an arm tip, this robot 15 being a multi-jointed robot, for example. Further, a three-dimensional model of a workpiece W is displayed near the robot 15. These three-dimensional models are arranged so as to correspond to the actual robot 15, tool 16, and the workpiece W.

As illustrated in FIG. 1, the controller 12 includes the program storage unit 21 and an initial storage unit 22. The program storage unit 21 stores an operational program of the robot 15 and the initial storage unit 22 stores, as initial cycle time CT0, cycle time CT of the operational program when the operational program stored in the program storage unit 21 is executed by simulation. The initial storage unit 22 stores, as a plurality of initial teaching points, a plurality of teaching points of the operational program, and stores, as an initial teaching sequence, a teaching sequence of a plurality of the initial teaching points when the operational program stored in the program storage unit 21 is executed by simulation.

Moreover, the controller 12 functions as a sequence interchanging unit 23 that interchanges a teaching sequence of a plurality of the teaching points, so that the sum of the movement time of the robot 15 to move between the respective pairs of a plurality of the teaching points becomes smaller than when the robot 15 moves in line with the initial teaching sequence of a plurality of the initial teaching points stored in the initial storage unit 22.

Further, the controller 12 functions as the arm tip position storage unit 24 that stores the positions of the arm tip of the robot 15 at predetermined time intervals when the after-interchanged operational program of which teaching sequence is executed by simulation, as a trajectory of the robot 15 formed on the basis of the positions at predetermined time intervals stored by the arm tip position storage unit 24, and as the calculating unit 25 which calculates a difference amount between a trajectory and the initial teaching points stored in the initial storage unit 22, which calculation is performed at each initial teaching point.

Furthermore, the controller 12 functions as the position adjusting unit 26 that adjusts the positions of the teaching points of the after-interchanged operational program until the difference amount calculated by the calculating unit 25 becomes equal to or smaller than a predetermined allowable value, as the position adjusting unit 26 that adjusts the position of the teaching points, and as a teaching point changing unit 27 that adopts the initial teaching sequence after changing the adjusted teaching points to be the initial teaching points, when a cycle time CT of the after-interchanged operational program including the teaching points adjusted by the position adjusting unit 26 and executed by simulation is longer than the initial cycle time CT0 stored in the initial storage unit 22.

The sequence interchanging unit 23 includes a movement time calculating unit 31, a determining unit 32, a sequence adopting unit 33, an allowable value changing unit 34, and a repeating unit 35. The movement time calculating unit 31 divides a movement angle around each axis of the robot 15 by a rotational speed around each axis of the robot 15 to calculate movement time respectively spent between respective two of the teaching points in the before-interchanged operational program and the after-interchanged operational program. The determining unit 32 interchanges, in the teaching sequence, the two teaching points among a plurality of the teaching points in the operational program, and then estimates whether or not a difference is equal to or smaller than an allowable value, this difference being obtained by subtracting, from the sum of the movement time of the robot 15 respectively spent between respective two of a plurality of the teaching points after interchange of the teaching points, the sum of the respective movement time of the robot 15 before interchange of the teaching points. When the determining unit 32 determines that the difference is equal to or smaller than the allowable value, the sequence adopting unit 33 adopts the teaching sequence after interchange of the teaching points. When the determining unit 32 determines that the difference is not equal to or smaller than the allowable value, the sequence adopting unit 33 adopts the teaching sequence before interchange of the teaching points. After the sequence adopting unit 33 adopts the teaching sequence after interchange of the teaching points or the teaching sequence before interchange of the teaching points, the allowable value changing unit 34 changes the allowable value to be decreased by a predetermined amount. Until the allowable value changed by the allowable value changing unit 34 becomes a specified value, the repeating unit 35 repeats a process of interchanging the teaching points in the teaching sequence within the predetermined maximum attempting number of times.

As described later, the sequence interchanging unit 23 may interchange the teaching sequence of the teaching points on the basis of an angle formed by the movement vectors respectively corresponding to a first and a second operational segments that respectively exist between respective two of the three successive teaching points of the operational program, and on the basis of movement time for the second operational segment.

Further, the controller 12 functions as a changing unit 36. Directly before positions of the teaching points of the operational program are adjusted, the changing unit 36 changes a command value concerning at least one of a speed, acceleration, and a smoothing degree of the robot 15 in the operational program such that cycle time CT of the operational program is shortened.

Figure 2:
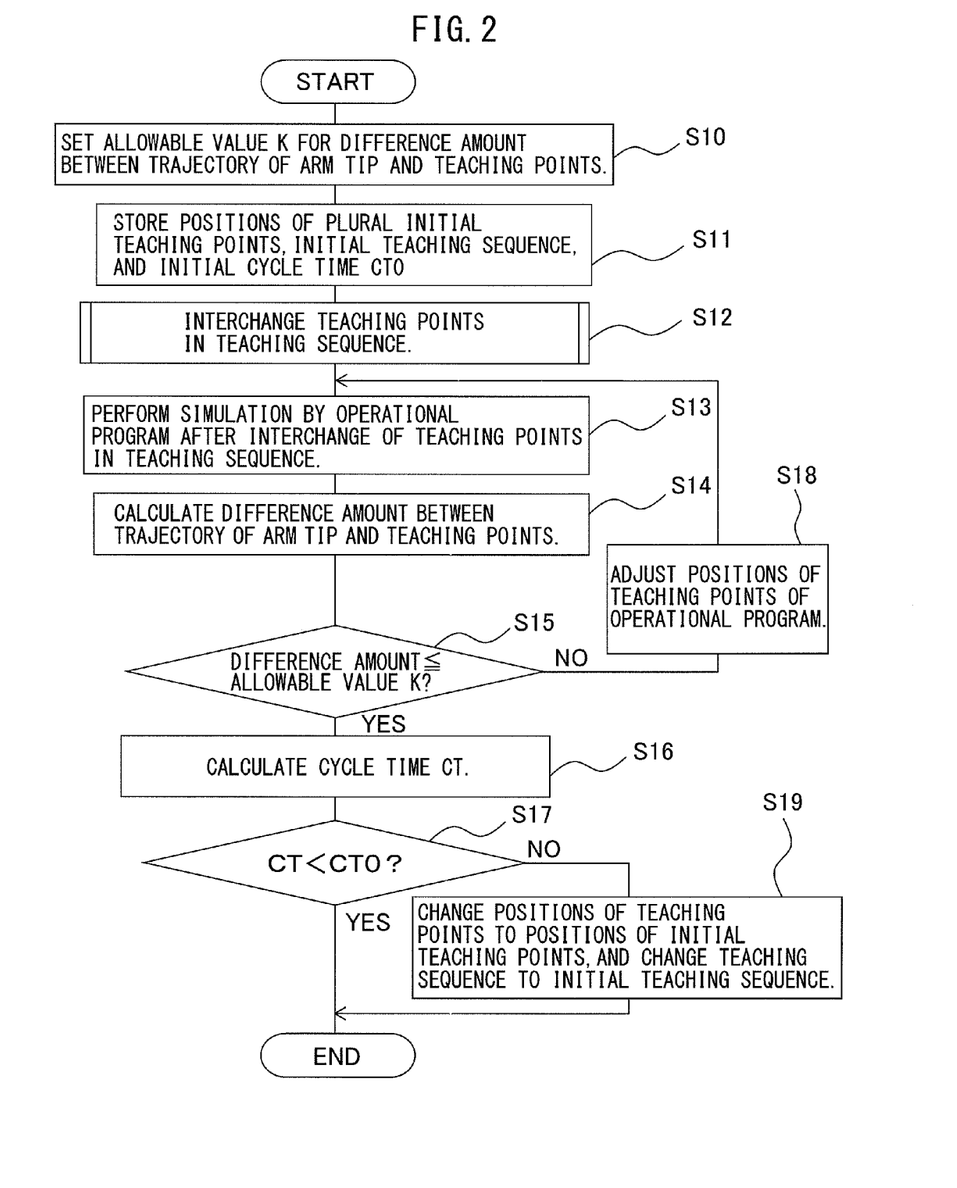
FIG. 2 is a flowchart for explanation of an operation of the robot program changing device based on the present invention.

FIG. 2 is a flowchart for explanation of operation of the robot program changing device based on the present invention. A control program indicating the operation of FIG. 2 and so on, and various types of data used in FIG. 2 and so on are separately stored in the program storage unit 21 of the controller 12. In the following, referring to FIG. 1 and FIG. 2, the robot program changing device 10 according to the embodiment of the present invention will be described.

In the embodiment of the present invention, regarding two successive movement commands described in the operational program of the robot 15, while deceleration indicated by the first movement command is being performed, acceleration indicated by the second movement command is performed so that shift from the first movement command to the second movement command can be smoothed. In other words, in the embodiment of the present invention, as described with reference to FIGS. 12A to 12C, the smooth operation is performed at the time of movement from a teaching point to another teaching point.

First, at the step S10 of FIG. 2, an operator uses the input unit 13 to set the allowable value K (mm) for a difference amount between the teaching points and the trajectory of the arm tip of the robot 15. This trajectory is defined by the operational program. The allowable value K may be relatively small positive value, or may be zero.

Then, at the step S11, the controller 12 reads the operational program from the program storage unit 21. Then, the controller 12 stores positions of a plurality of the teaching points described in the operational program, as positions of the initial teaching points in the initial storage unit 22, and stores the teaching sequence of the initial teaching points as the initial teaching sequence in the initial storage unit 22. Further, the controller 12 executes the operational program by simulation to obtain cycle time CT of the operational program, and stores the obtained cycle time CT as the initial cycle time CT0 in the initial storage unit 22.

Then, at the step S12, the controller 12 uses the sequence interchanging unit 23 to interchange at least two teaching points in the teaching sequence so as to shorten a movement distance between at least two teaching points. The process of interchanging the teaching points in the teaching sequence will be described in detail later.

Then, at the step S13, the controller 12 simulates the after-interchanged operational program for which the teaching points have been interchanged in the teaching sequence. By this simulation, the positions of the arm tip of the robot 15 that are moved at the predetermined time intervals are obtained. Accordingly, the controller 12 stores these obtained positions in the arm tip position storage unit 24.

Figure 3:
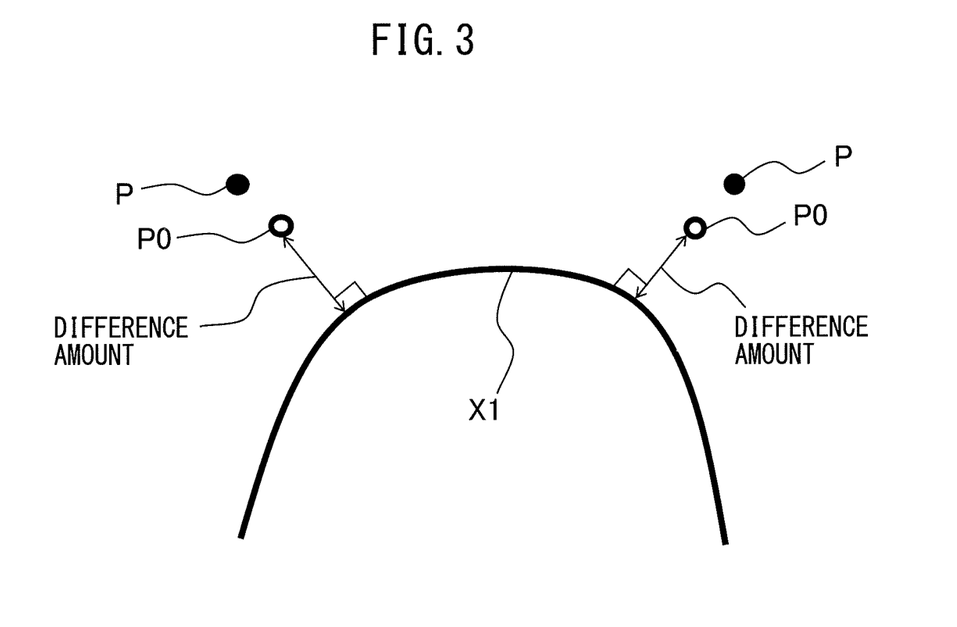
FIG. 3 illustrates initial teaching points and a trajectory.

At the step S14, the controller 12 creates a trajectory of the arm tip on the basis of the positions stored in the arm tip position storage unit 24. Further, the controller 12 reads a plurality of the initial teaching points from the initial storage unit 22. FIG. 3 illustrates the initial teaching points, the trajectory, and so on. In FIG. 3, the initial teaching points P0, and the teaching points P of the after-interchanged operational program are depicted. Further, in FIG. 3, the trajectory X1 created on the basis of the after-interchanged operational program is depicted. In the embodiment of the present invention, the smooth operation is performed, so that the trajectory X1 is not positioned at the teaching points P of the after-interchanged operational program. At the step S14, the calculating unit 25 calculates a difference amount for each of the initial teaching points, the difference amount being a difference between the trajectory X1 and each of a plurality of the initial teaching points P0 of the before-interchanged operational program. As can be seen from FIG. 3, the difference amount corresponds to the shortest distance between each of the initial teaching points P0 and the trajectory X1.

Then, at the step S15, the controller 12 determines whether or not the difference amount is equal to or smaller than the allowable value K. When the controller 12 determines that all of the difference amounts are equal to or smaller than the allowable value K, the process proceeds to the step S16. At the step S16, the controller 12 executes the after-interchanged operational program by simulation to calculate cycle time CT of the after-interchanged operational program.

On the contrary, when the controller 12 determines that at least one of the difference amounts is not equal to or smaller than the allowable value K at the step S15, the process proceeds to the step S18. At the step S18, the position adjusting unit 27 adjusts the positions of a plurality of the teaching points of the after-interchanged operational program. Then, until the difference amounts for all of the teaching points become equal to or smaller than the allowable value K, the controller 12 repeats the process of the above-described steps S13, S14, S15, and S18. Concrete operation of the position adjusting unit 27 will be described later.

Then, at the step S17, the controller 12 compares the cycle time CT with the initial cycle time CT0 stored in the initial storage unit 22. Then, when the cycle time CT is smaller than the initial cycle time CT0, the controller 12 adopts the after-interchanged operational program without correction. On the contrary, when the cycle time CT is not smaller than the initial cycle time CT0, the position adjusting unit 27 changes all of the positions of the teaching points P to be the initial teaching points P0, and returns the operational program to the program adopting the initial teaching sequence.

As described above, according to the embodiment of the present invention, the teaching points are interchanged in the teaching sequence of the operational program, and the positions of the teaching points are adjusted such that difference amounts between the trajectory and the initial teaching points are equal to or smaller than the allowable value K. When cycle time shorter than the initial cycle time is obtained, such an operational program is excluded. Accordingly, even when teaching is performed in the smooth operation, the operational program can be changed such that not only cycle time is made short, but also the robot moves in a range including the initial teaching points.

Figure 4:
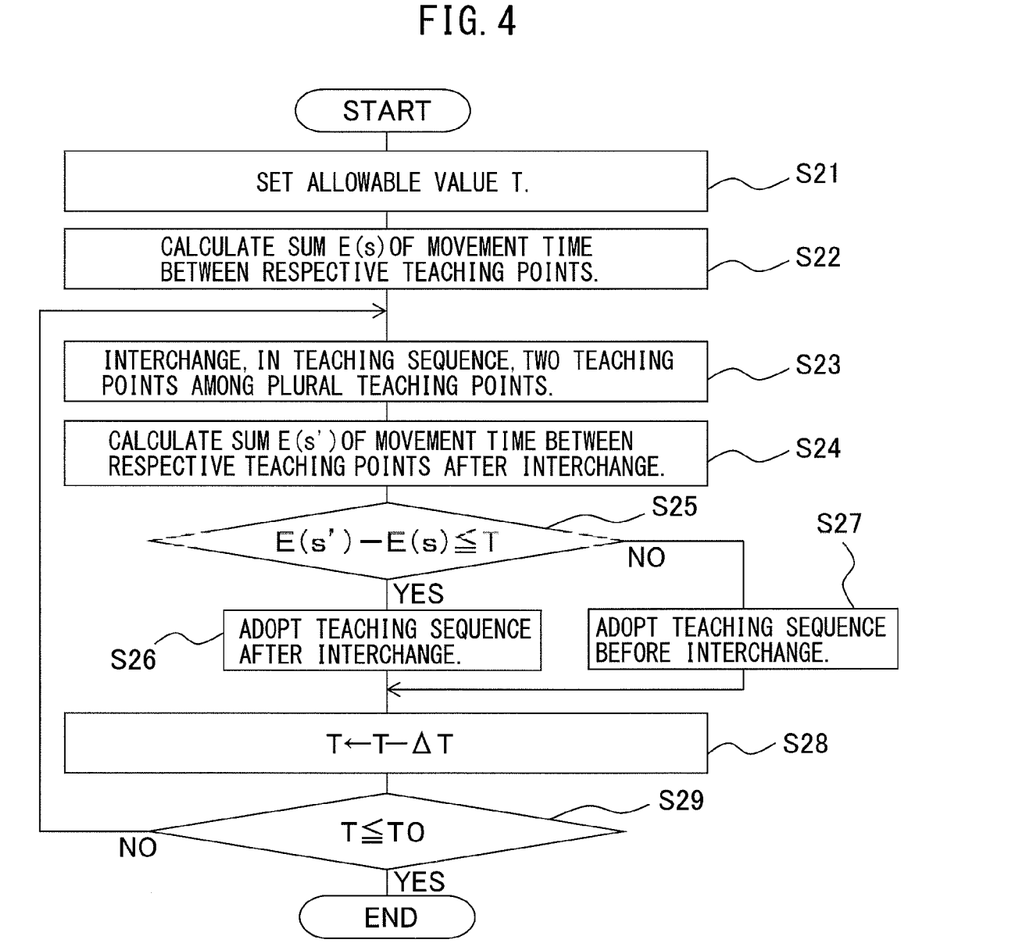
FIG. 4 is a flowchart for explanation of interchanging operation for interchanging a teaching sequence of teaching points.

FIG. 4 is a flowchart for explanation of interchanging operation for interchanging the teaching points in the teaching sequence. In the following, referring to FIG. 4, the interchanging operation of the sequence interchanging unit 23 will be described. First, at the step S21 of FIG. 4, an operator uses the input unit 13 to set an allowable value T of the total movement time that is obtained by summing time that is respectively spent by the robot 15 to move between respective two of the teaching points. The allowable value T is an allowable margin of error of the total movement time. Preferably, at the step S21, the allowable value T is set as a relatively large value.

Then, at the step S22, the movement time calculating unit 31 calculates total movement time E(s) of time respectively spent by the robot 15 to move between respective two of the teaching points of the operational program before the teaching points are interchanged in the teaching sequence s. Specifically, the movement time calculating unit 31 divides a movement angle around each axis of the robot 15 for all positions of the teaching points by a rotational speed around each axis of the robot 15 to obtain movement time spent to move between the teaching points. Then, the movement time calculating unit 31 sums the obtained movement time to calculate the total movement time E(s).

Figure 5A:
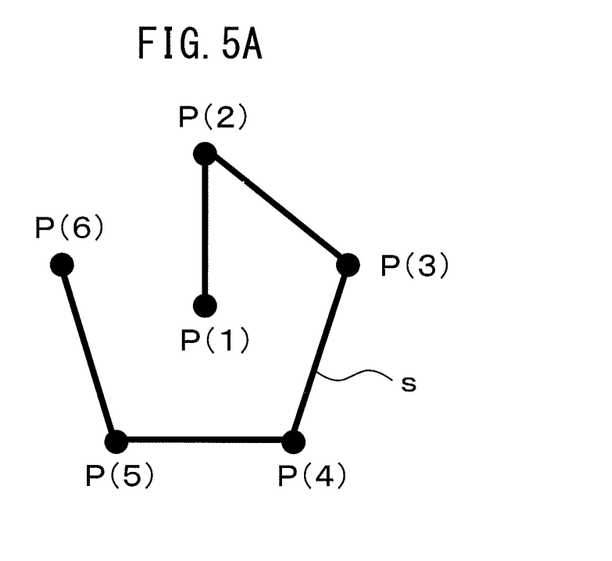
FIG. 5A illustrates a teaching sequence of a plurality of teaching points before interchange.

FIG. 5A and FIG. 5B illustrate teaching sequences of a plurality of teaching points. As illustrated in FIG. 5A, before interchange of the teaching points in the teaching sequence, a plurality of teaching points, for example, six teaching points P(1) to P(6) are arranged in line with the teaching sequence s (P(1)-P(2)-P(3)-P(4)-P(5)-P(6)).

Figure 5B:
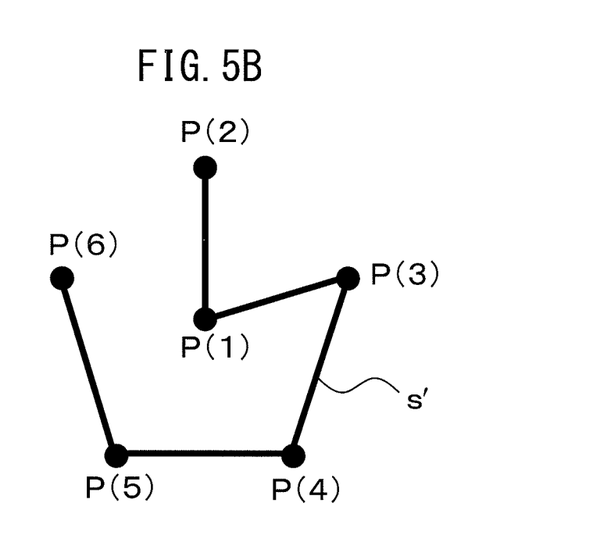
FIG. 5B illustrates a teaching sequence of a plurality of teaching points after interchange.

Then, at the step S23, the sequence interchanging unit 23 interchanges, in the teaching sequence, two of a plurality of the teaching points of the operational program. For example, when the two teaching points P(1) and P(2) illustrated in FIG. 5A are interchanged in the teaching sequence, a new teaching sequence s' (P(2)-P(1)-P(3)-P(4)-P(5)-P(6)) is obtained as illustrated in FIG. 5B. Then, at the step S24, as described above, the movement time calculating unit 31 calculates total movement time E(s') for the after-interchanged operational program in accordance with the new teaching sequence s'.

Then, at the step S25, the sequence interchanging unit 23 subtracts the before-interchanged total movement time E(s) from the after-interchanged total movement time E(s') to calculate a difference therebewteen. The determining unit 32 determines whether or not this difference is equal to or smaller than the allowable value T. When the difference is equal to or smaller than the allowable value T, the process proceeds to the step S26 at which the sequence interchanging unit 23 adopts the after-interchanged teaching sequence s'. On the contrary, when the difference is not equal to or smaller than the allowable value T, the process proceeds to the step S27 at which the sequence interchanging unit 23 adopts the before-interchanged teaching sequence s.

Then, the process proceeds to the step S28 at which the allowable value changing unit 34 decreases the allowable value T by a predetermined minute value ΔT. Thereafter, the process proceeds to the step S29 at which the sequence interchanging unit 23 determines whether or not the allowable value T reaches a predetermined specified value T0 (<T).

When the sequence interchanging unit 23 determines that the allowable value T is equal to or smaller than the specified value T0, the process is terminated. On the contrary, when the sequence interchanging unit 23 determines that the allowable value T is not equal to or smaller than the predetermined specified value T0, the process returns to the step S23, and the repeating unit 35 repeats the above-described process until the allowable value T becomes equal to or smaller than the predetermined specified value T0. In this manner, according to the embodiment of the present invention, the teaching points can be interchanged in the teaching sequence such that total movement time spent to move between the teaching points is shortened.

Figure 6:
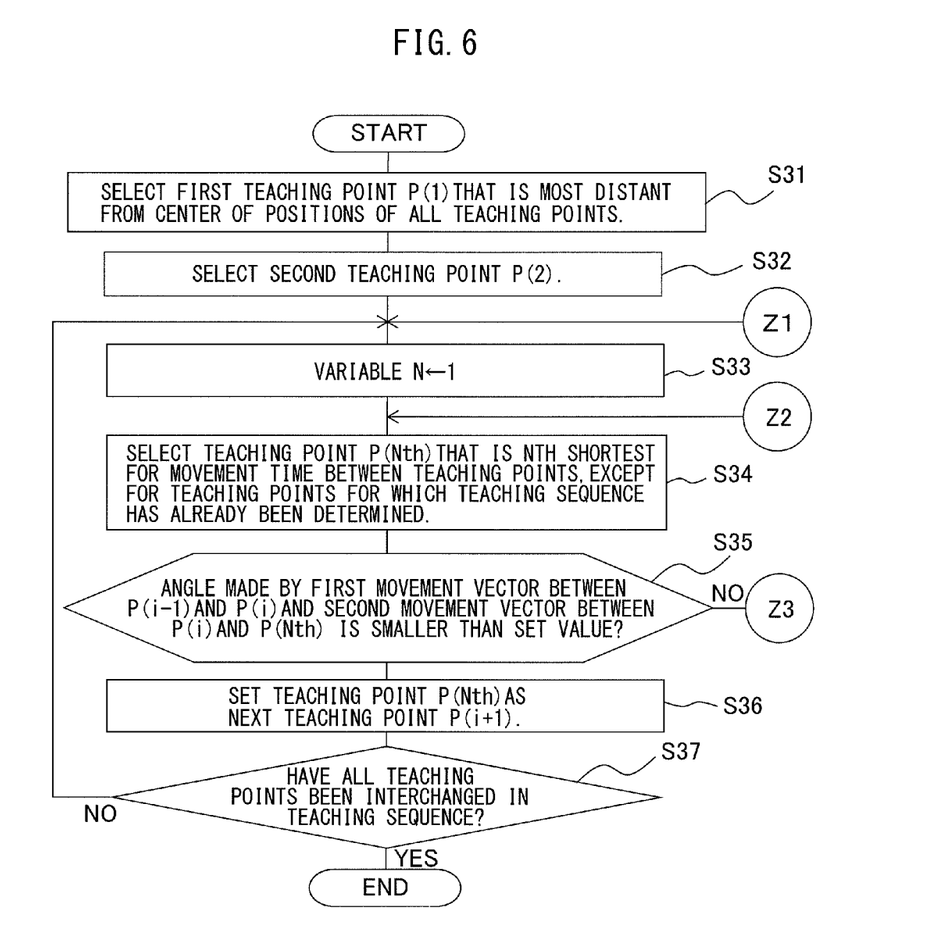
FIG. 6 is a first flowchart for explanation of another interchanging operation for interchanging a teaching sequence of teaching points.
Figure 7:
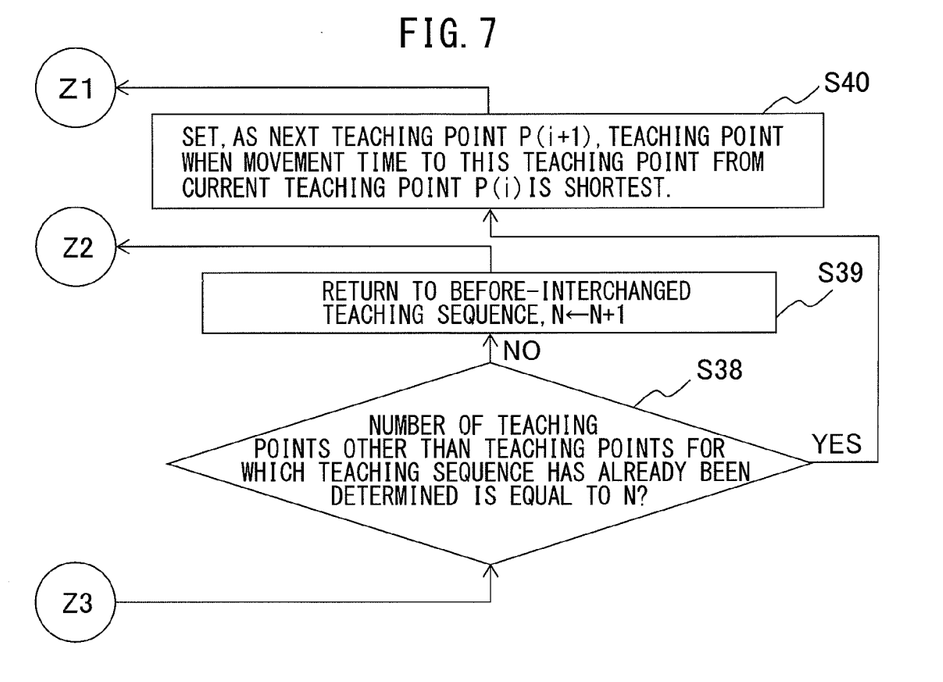
FIG. 7 is a second flowchart for explanation of another interchanging operation for interchanging a teaching sequence of teaching points.
Figure 8:
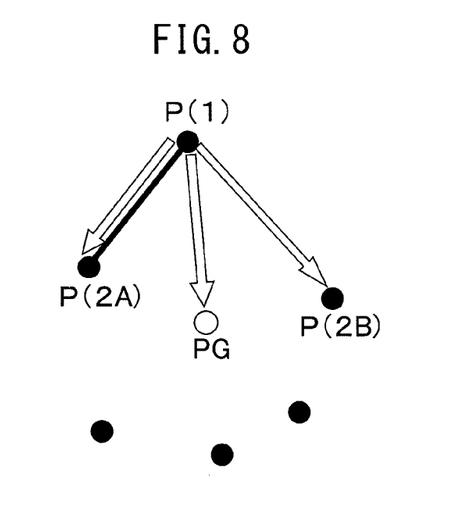
FIG. 8 illustrates a plurality of teaching points.
Figure 9:
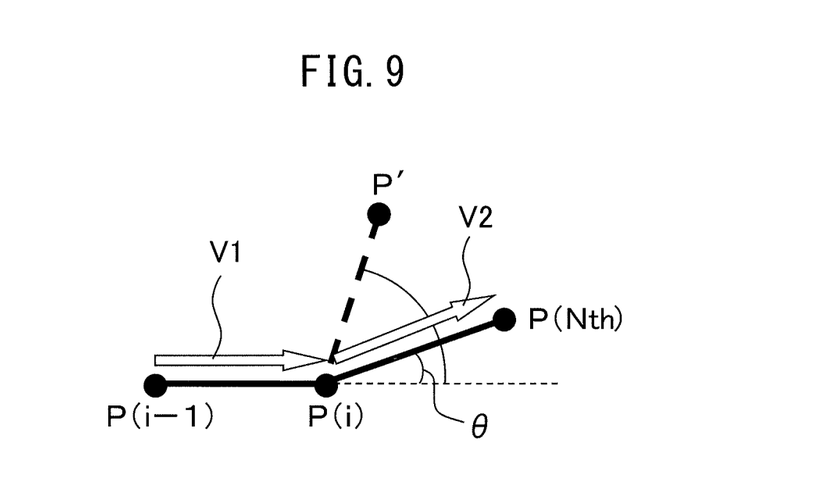
FIG. 9 also illustrates a plurality of teaching points.

FIG. 6 and FIG. 7 are flowcharts for explanation of another interchanging process of interchanging teaching points in a teaching sequence. FIG. 8 and FIG. 9 illustrate a plurality of teaching points. In the following, referring to FIGS. 6 to 9, another interchanging process of the sequence interchanging unit 23 will be described.

First, at the step S31 in FIG. 6, the sequence interchanging unit 23 obtains a center PG of all of teaching points of the operational program. As illustrated in FIG. 8, the center PG is arranged among positions of six teaching points shown by the black circles. The sequence interchanging unit 23 selects, as a first teaching point P(1), the teaching point that is the most distant from the center PG.

Then, at the step S32, the sequence interchanging unit 23 selects a second teaching point P(2) from the remaining teaching points as follows. First, the sequence interchanging unit 23 creates a vector P(1)PG directed from the first teaching point P(1) toward the center PG, and vectors directed from the first teaching point P(1) toward the remaining respective teaching points. Then, the sequence interchanging unit 23 determines the vector that makes the maximum angle with the vector P(1)PG clockwise, and the vector that makes the maximum angle with the vector P(1)PG counterclockwise. These angles are equal to or smaller than 90 degrees.

In FIG. 8, the vector P(1)P(2B) is a vector making the maximum angle with the vector P(1)PG counterclockwise, and the vector P(1)P(2A) is a vector making the maximum angle with the vector P(1)PG clockwise. Then, the sequence interchanging unit 23 compares movement time between the teaching points P(1) and P(2B) with movement time between the teaching points P(1) and P(2A) to select, as the second teaching point P(2), the teaching point P(2A) for the shorter movement time. The movement time between the teaching points are obtained by the above-described movement time calculating unit 31.

Then, at the step S33, the sequence interchanging unit 23 sets a variable N as a value "1". Then, at the step S34, except for the teaching points for which the teaching sequence has already been determined (for example, the teaching point P(1), P(2)), the sequence interchanging unit 23 selects the teaching point P(Nth) on the condition that the movement time between the teaching point P(Nth) and the current teaching point P(i) is the Nth shortest. The movement time between the teaching points are obtained by the above-described movement time calculating unit 31.

Then, at the step S35, as illustrated in FIG. 9, the two teaching points P(i−1) and P(i) preceding the teaching point P(Nth) are considered. These three teaching points P(i−1), P(i), and P(Nth) are consecutive points. The sequence interchanging unit 23 sets a first movement vector V1 of a first segment between the two teaching points P(i−1) and P(i), and a second movement vector V2 of a second segment between the two teaching points P(i) and P(Nth). Further, the sequence interchanging unit 23 determines whether or not an angle $\theta$ made by the first movement vector V1 and the second movement vector V2 is smaller than a predetermined set value $\theta 0$.

When the sequence interchanging unit 23 determines that the angle $\theta$ is smaller than the predetermined set value $\theta 0$, the process proceeds to the step S36 at which the sequence interchanging unit 23 sets the teaching point P(Nth) as a next teaching point P(i+1). In this regard, FIG. 9 illustrates the teaching point P' when a distance to the teaching point P' from the teaching point P(i) is approximately equal to a distance to the teaching point P(Nth) from the teaching point P(i). However, the teaching point P' makes the above-described angle larger than the set value $\theta 0$. Accordingly, the teaching point P' is not set as the next teaching point P(i+1).

When the next teaching point P(i+1) is set, at the step S37, the sequence interchanging unit 23 determines whether or not all of the teaching points have been interchanged in the teaching sequence. When all of the teaching points have been interchanged in the teaching sequence, the process is terminated. On the contrary, when all of the teaching points have not been interchanged in the teaching sequence, the process returns to the step S33 to repeat the process.

Meanwhile, when it is determined at the step S35 that the angle $\theta$ is not smaller than the predetermined set value $\theta 0$, the process proceeds to the step S38. At the step S38, the sequence interchanging unit 23 determines whether or not the variable N is equal to the number of the teaching points other than the teaching points for which turns in the teaching sequence have already been determined. When the variable N is not equal to the number of the remaining teaching points, at the step S39, the sequence interchanging unit 23 returns the teaching sequence to the before-interchanged teaching sequence, and adds a value "1" to the variable N. Then, the process returns to the step S34 to repeat the process.

On the contrary, when the variable N is equal to the number of the remaining teaching points, the process proceeds to the step S40. At the step S40, the sequence interchanging unit 23 sets, as a next teaching point P(i+1), the teaching point on the condition that the movement time spent to move to this teaching point from the current teaching point P(i) is the shortest. Then, the process returns to the step S33 to repeat the process.

In FIG. 6, at the step S34, the sequence interchanging unit 23 selects the teaching point on the condition that movement time to this teaching point is short. Accordingly, it is understood that a plurality of the teaching points are interchanged in the teaching sequence such that an average movement speed of the arm tip of the robot 15 is increased.

Figure 10:
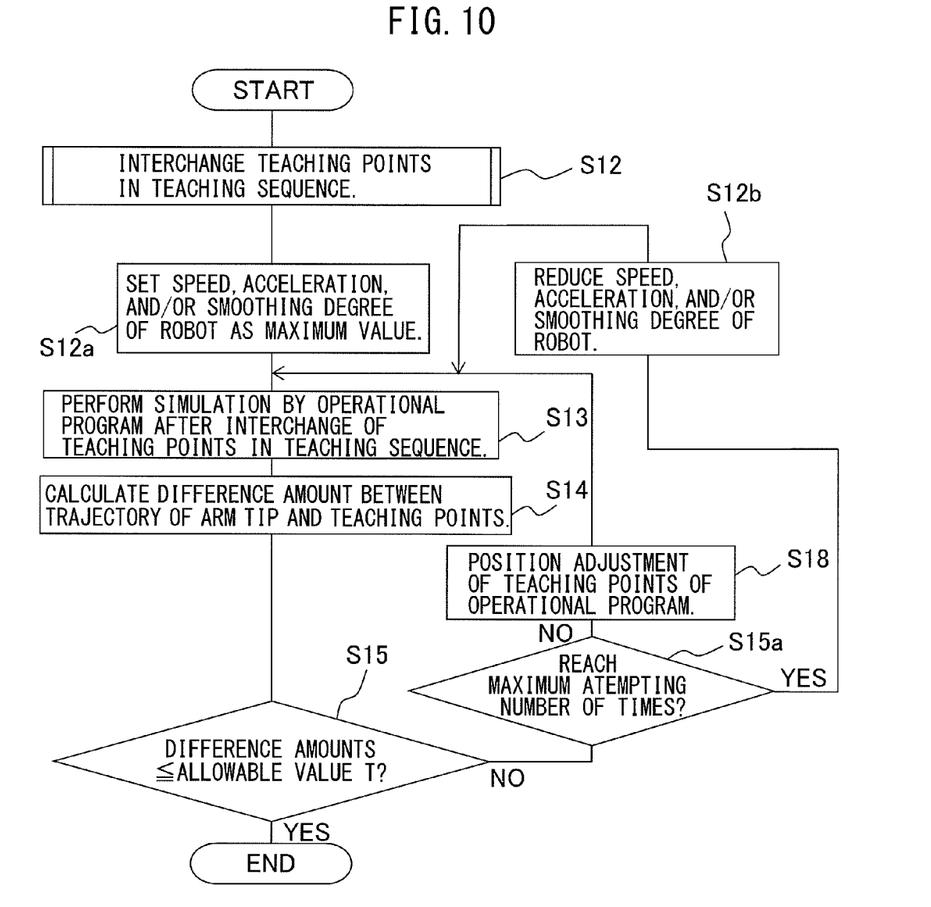
FIG. 10 is another flowchart for explanation of operation of the robot program changing device based on the present invention.

FIG. 10 is another flowchart for explanation of operation of the robot program changing device based on the present invention. FIG. 10 is the flowchart only for the steps S12 to S15, and S18 in FIG. 2. For simplicity, in FIG. 2, the steps S10, S11, S16, S17, and S19 are omitted. The repeat description that was made for the steps referring to FIG. 2 will be omitted.

In the following, referring to FIG. 10, differences from FIG. 2 will be mainly described. In order to adjust positions of the teaching points of the operational program at the step S18, as described at the step S12a, preferably, the control device 12 sets a command speed, a command acceleration, and/or a command smoothing degree of the robot 15, as the respective maximum values. The smoothing degree representing a degree of the smooth operation is expressed by percentage. Then, when it is determined at the step S15 that the calculated difference amount is not equal to or smaller than the allowable value K, the process proceeds to the step S15a. At the step S15a, the controller 12 determines whether or not the number of times of repeating the process of the steps S13 to S15 reaches the maximum attempting number of times that was set in advance by an operator.

When the number of times of repeating the process of the steps S13 to S15 reaches the maximum attempting number of times, the process proceeds to the step S12b. At the step S12b, the changing unit 36 decreases the command speed, the command acceleration, and/or the command smoothing degree of the robot 15 by a predetermined amount thereof, respectively. Then, the process returns to the step S13. On the contrary, when the number of times of repeating the process of the steps S13 to S15 does not reach the maximum attempting number of times, at the step S18, the position adjusting unit 27 adjusts the positions of the teaching points of the operational program. This process of adjusting the positions of the teaching points is the same as that of the step S18 in the flowchart of FIG. 2.

Figure 11:
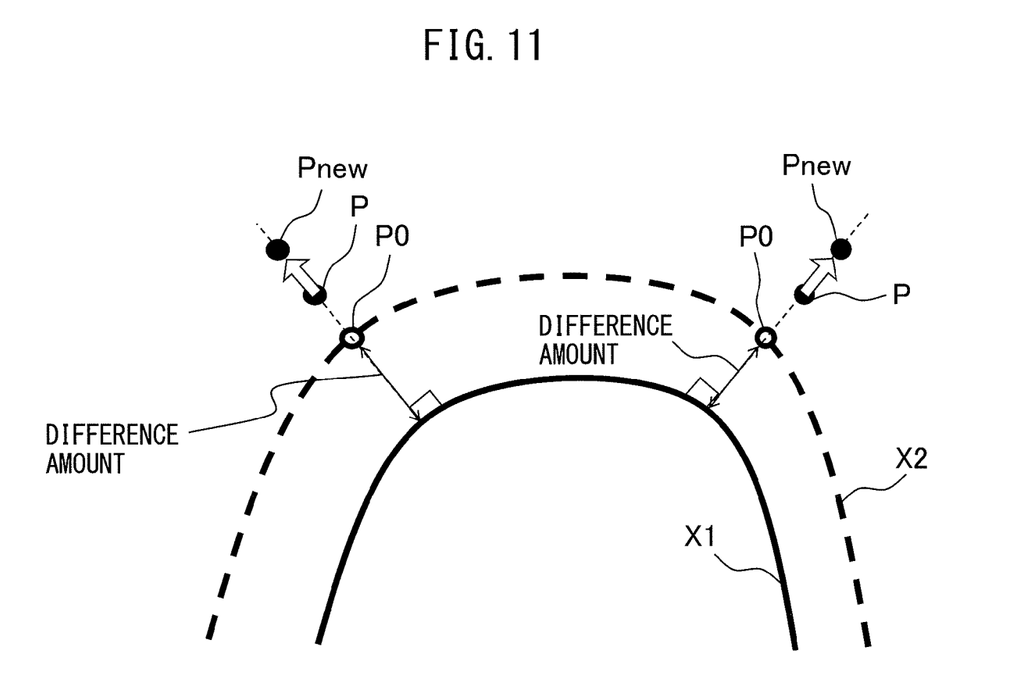
FIG. 11 also illustrates initial teaching points and a trajectory.

FIG. 11 is another drawing illustrating the initial teaching points and the trajectory. As illustrated in FIG. 11, the controller 12 determines a direction in which a distance between the initial teaching points P0 and the trajectory X1 becomes the shortest. Then, the control device 12 shifts the teaching points P by a predetermined distance such that these teaching points P move away from the initial teaching points P0 in the determined direction. In FIG. 11, the position adjusting unit 27 shifts two teaching points P to the positions of the teaching points Pnew, respectively.

The broken line X2 drawn in FIG. 11 is a trajectory of the arm tip of the robot 15, the trajectory being formed on the basis of the teaching points Pnew by the process of the step S13. As illustrated in FIG. 11, the broken line X2 is positioned on the initial teaching points P0. In other words, the trajectory X2 illustrated in FIG. 11 is finally obtained when the allowable value K is set as zero.

In this case, even when teaching in the smooth operation is performed, the operational program can be changed such that the robot can move via the initial teaching points P0 while cycle time of the operational program is shortened. Such an effect would be understood.

By the way, at the step S16 that is not depicted in FIG. 10, the controller 12 calculates cycle time CT. When the process reached the step S16, the controller 12 had already performed the process of adjusting the positions of the teaching points at the step S18, or the process of decreasing the command speed, the command acceleration, and/or the command smoothing degree at the step S12b. Two types of the operation of interchanging the teaching points in the teaching sequence were described with reference to FIGS. 4 and 6, respectively, and both of these two types of the operation may be performed at the step S12 in FIG. 10.

In this case, at the step S16 that is not depicted in FIG. 10, the controller 12 obtains two types of cycle time. At the step S11 (not depicted in FIG. 10), the controller 12 obtains the initial cycle time CT0. For this reason, at the step S17 that is not depicted in FIG. 10, the controller 12 may select the shortest cycle time from the initial cycle time CT0 and the two types of cycle time. Thereby, it is possible to select the operational program for which the position adjusting process or the like has been performed so as to obtain the shorter cycle time. This effect would be understood.

ADVANTAGE OF THE INVENTION

According to a first aspect, the teaching points are interchanged in the teaching sequence of the operational program, and the positions of the teaching points are adjusted such that difference amounts between the trajectory and the initial teaching points are equal to or smaller than the allowable value. When cycle time shorter than the initial cycle time is obtained, such an initial operational program is excluded. Accordingly, even when teaching is performed in the smooth operation, the operational program can be changed such that not only cycle time is made short, but also the robot moves in a range including the initial teaching points.

According to a second aspect, the teaching points are interchanged in the teaching sequence such that total movement time between the teaching points becomes smaller.

According to a third aspect, the teaching points are interchanged in the teaching sequence such that an average movement speed of the arm tip of the robot becomes larger.

According to a fourth aspect, it is possible to determine positions of the teaching points that enable difference amounts between the trajectory and the initial teaching points to become equal to or smaller than the allowable value.

According to a fifth aspect, a speed, acceleration, and/or a smoothing degree of the robot is changed so that cycle time of the operational program can be shortened.

The present invention was described by using the typical embodiments. However, a person skilled in the art would understand that the above-described alternations, and various other alternations, omission, and additions can be made without departing from the scope of the present invention.

What is claimed is:
1. A robot program changing device that changes a program of a robot performing smooth operation in which while deceleration is being performed by a first movement command, acceleration is performed by a second movement command to smoothly shift from the first movement command to the second movement command, comprising:
  a program storage unit for storing an operational program of the robot;
  an initial storage unit for storing cycle time of the operational program as initial cycle time, storing positions of a plurality of teaching points of the operational program as a plurality of initial teaching points, and storing a teaching sequence of the plurality of initial teaching points of the operational program as an initial teaching sequence, when the operational program stored in the program storage unit is executed by simulation;
  a sequence interchanging unit for interchanging the plurality of teaching points in the teaching sequence such that sum of movement time of the robot respectively spent by the robot to move between respective two of the plurality of teaching points becomes smaller than sum of movement time when the robot is moved in line with the initial teaching sequence of the plurality of initial teaching points stored in the initial storage unit;
  an arm tip position storage unit for storing positions of an arm tip of the robot at predetermined time intervals when an after-interchanged operational program for which the teaching points have been interchanged in the teaching sequence by the sequence interchanging unit is executed by simulation;
  a calculating unit for calculating, for each initial teaching point, a difference amount between a trajectory of the robot and the initial teaching points stored in the initial storage unit, the trajectory being created on the basis of the positions, stored in the arm tip position storage unit, at the predetermined time intervals;
  a position adjusting unit for shifting the positions of the arm tip of the robot at predetermined time intervals stored in the arm tip position storage unit by a predetermined distance such the positions of the arm tip move away from the initial teaching points in a direction in which a distance between the initial teaching points and the trajectory of the robot becomes the shortest, and for adjusting the positions of the teaching points of the after-interchanged operational program until the difference amount, which are calculated by the calculating unit, between the initial teaching points and a new trajectory of the robot based on the positions of the arm tip after shifting become equal to or smaller than a predetermined allowable value; and
  a teaching point changing unit for, when the after-interchanged operational program including the teaching points adjusted by the position adjusting unit is executed by simulation, if cycle time of the executed after-interchanged operational program is longer than the initial cycle time stored in the initial storage unit, changing the adjusted teaching points to be the initial teaching points to adopt the initial teaching sequence.

2. The robot program changing device according to claim 1, wherein the sequence interchanging unit comprises:
  a movement time calculating unit for dividing a movement angle around each axis of the robot by a rotational speed around each axis of the robot to calculate movement time respectively spent between respective two of the teaching points in the after-interchanged operational program, and the operational program before interchange of the teaching points in the teaching sequence;
  a determining unit for interchanging, in the teaching sequence, two teaching points among the plurality of teaching points in the operational program, and estimating whether or not a difference is equal to or smaller than a time allowable value, the difference being obtained by subtracting, from sum of the movement time of the robot respectively spent between respective two of the plurality of teaching points after interchange of the teaching points, sum of the respective movement time of the robot before interchange of the teaching points;

a sequence adopting unit for adopting the teaching sequence after interchange of the teaching points when the determining unit determines that the difference is equal to or smaller than the time allowable value, and adopting the teaching sequence before interchange of the teaching points when the determining unit determines that the difference is not equal to or smaller than the time allowable value;

an allowable value changing unit for changing the allowable value to be decreased by a predetermined amount after the sequence adopting unit adopts the teaching sequence after interchange of the teaching points or the teaching sequence before interchange of the teaching points; and a repeating unit for repeating a process of interchanging the teaching points in the teaching sequence within the predetermined maximum attempting number of times until the allowable value changed by the allowable value changing unit becomes a predetermined specified value.

3. The robot program changing device according to claim 1, wherein the sequence interchanging unit interchanges the teaching points in the teaching sequence on the basis of an angle made by first and second movement vectors respectively corresponding to first and second operational segments that respectively exist between respective two of three successive teaching points of the operational program, and on the basis of movement time for the second operational segment.

4. The robot program changing device according to claim 1, wherein when the difference amount calculated by the calculating unit exceeds the allowable value, the position adjusting unit performs position adjustment by shifting the teaching points of the after-interchanged program by a fixed distance in directions of vectors directed toward the initial teaching points from the points that are positioned on the trajectory such that distances from the initial teaching points to the points on the trajectory become the smallest.

5. The robot program changing device according to claim 2, wherein when the difference amount calculated by the calculating unit exceeds the allowable value, the position adjusting unit performs position adjustment by shifting the teaching points of the after-interchanged program by a fixed distance in directions of vectors directed toward the initial teaching points from the points that are positioned on the trajectory such that distances from the initial teaching points to the points on the trajectory become the smallest.

6. The robot program changing device according to claim 3, wherein when the difference amount calculated by the calculating unit exceeds the allowable value, the position adjusting unit performs position adjustment by shifting the teaching points of the after-interchanged program by a fixed distance in directions of vectors directed toward the initial teaching points from the points that are positioned on the trajectory such that distances from the initial teaching points to the points on the trajectory become the smallest.

7. The robot program changing device according to claim 1, further comprising a changing unit for changing a command value of at least one of a speed, acceleration and a smoothing degree of the robot in the operational program so as to decrease cycle time of the operational program, directly before position adjustment of the teaching points of the operational program is performed.

8. The robot program changing device according to claim 2, further comprising a changing unit for changing a command value of at least one of a speed, acceleration and a smoothing degree of the robot in the operational program so as to decrease cycle time of the operational program, directly before position adjustment of the teaching points of the operational program is performed.

9. The robot program changing device according to claim 3, further comprising a changing unit for changing a command value of at least one of a speed, acceleration and a smoothing degree of the robot in the operational program so as to decrease cycle time of the operational program, directly before position adjustment of the teaching points of the operational program is performed.

10. The robot program changing device according to claim 4, further comprising a changing unit for changing a command value of at least one of a speed, acceleration and a smoothing degree of the robot in the operational program so as to decrease cycle time of the operational program, directly before position adjustment of the teaching points of the operational program is performed.

11. The robot program changing device according to claim 5, further comprising a changing unit for changing a command value of at least one of a speed, acceleration and a smoothing degree of the robot in the operational program so as to decrease cycle time of the operational program, directly before position adjustment of the teaching points of the operational program is performed.

12. The robot program changing device according to claim 6, further comprising a changing unit for changing a command value of at least one of a speed, acceleration and a smoothing degree of the robot in the operational program so as to decrease cycle time of the operational program, directly before position adjustment of the teaching points of the operational program is performed.

* * * * *